United States Patent
Bjerge et al.

(10) Patent No.: US 9,249,779 B2
(45) Date of Patent: Feb. 2, 2016

(54) METHOD FOR CONTROLLING A WIND TURBINE

(71) Applicants: Martin Huus Bjerge, Kibaek (DK); Per Egedal, Herning (DK); Gustav Hoegh, Herning (DK); Ramakrishnan Krishna, Skjern (DK); Hans Laurberg, Århus C (DK)

(72) Inventors: Martin Huus Bjerge, Kibaek (DK); Per Egedal, Herning (DK); Gustav Hoegh, Herning (DK); Ramakrishnan Krishna, Skjern (DK); Hans Laurberg, Århus C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 543 days.

(21) Appl. No.: 13/718,574

(22) Filed: Dec. 18, 2012

(65) Prior Publication Data

US 2013/0161952 A1    Jun. 27, 2013

(30) Foreign Application Priority Data

Dec. 22, 2011 (EP) .................... 11195341

(51) Int. Cl.
*F03D 7/02* (2006.01)

(52) U.S. Cl.
CPC .............. *F03D 7/0224* (2013.01); *F03D 7/02* (2013.01); *F03D 7/0264* (2013.01); *F03D 7/0276* (2013.01); *F05B 2260/71* (2013.01); *F05B 2270/101* (2013.01); *F05B 2270/107* (2013.01); *F05B 2270/32* (2013.01); *F05B 2270/327* (2013.01); *F05B 2270/328* (2013.01); *Y02E 10/723* (2013.01)

(58) Field of Classification Search
CPC ....... F03D 7/02; F03D 7/0224; F03D 7/0264; F03D 7/0276; F05B 2260/71; F05B 2270/107; F05B 2270/32; F05B 2270/327; F05B 2270/328; F05B 2270/101
See application file for complete search history.

(56) References Cited

U.S. PATENT DOCUMENTS

| | | | |
|---|---|---|---|
| 5,289,041 A | 2/1994 | Holley | |
| 6,420,795 B1 * | 7/2002 | Mikhail et al. | 290/44 |
| 6,847,128 B2 * | 1/2005 | Mikhail et al. | 290/44 |
| 7,075,189 B2 * | 7/2006 | Heronemus et al. | 290/44 |
| 7,175,389 B2 * | 2/2007 | Moroz | 416/1 |
| 7,586,205 B2 * | 9/2009 | Krueger | 290/44 |
| 2010/0133817 A1 | 6/2010 | Herr | |
| 2010/0286835 A1 | 11/2010 | Dalsgaard | |

FOREIGN PATENT DOCUMENTS

EP    1990539 A1    11/2008

* cited by examiner

*Primary Examiner* — Igor Kershteyn

(57) ABSTRACT

A method for controlling a wind turbine with a rotor and at least one rotor blade, and a control unit are disclosed. The method is characterized in adjusting a pitch angle of the rotor blade and determining the limit of an input value based on the adjusted pitch angle, wherein the input value includes information about the turbine rotational speed.

13 Claims, 2 Drawing Sheets

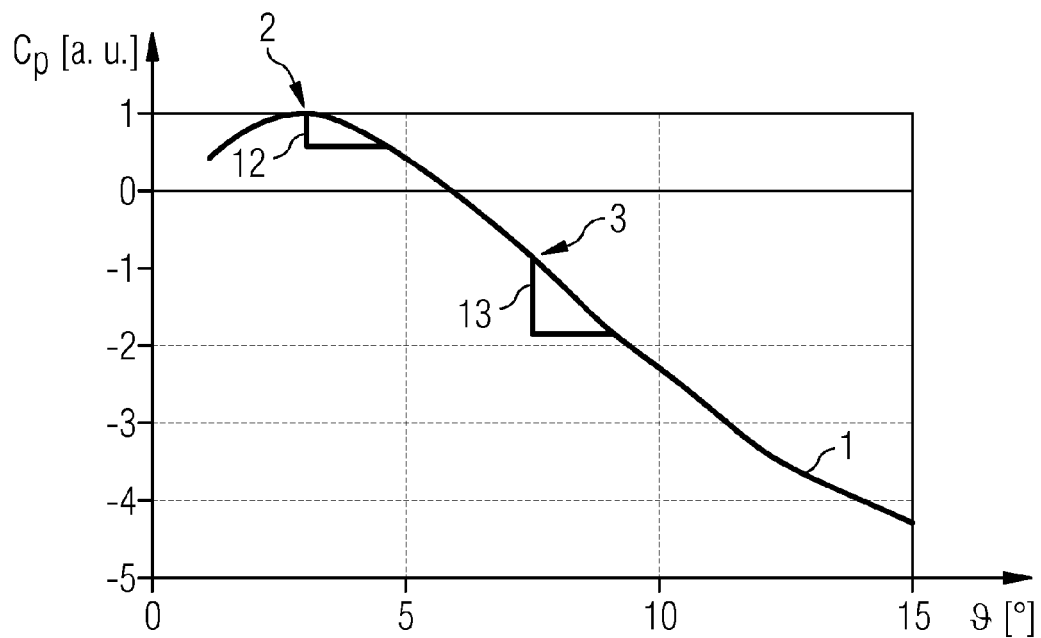
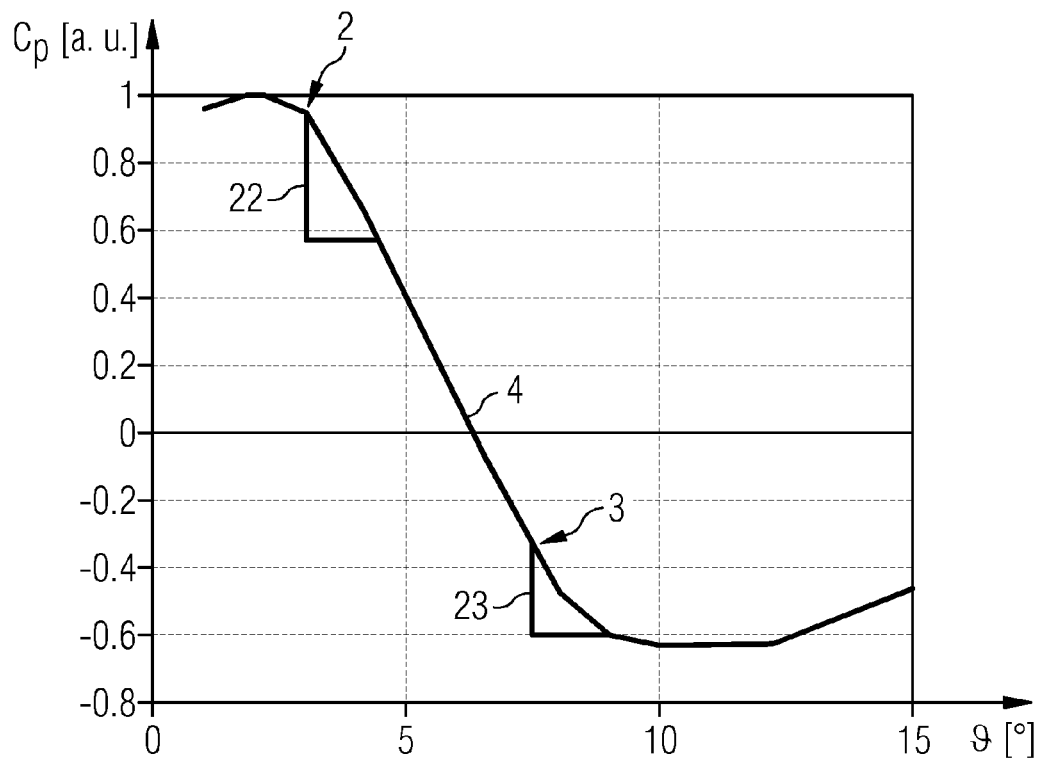

FIG 3
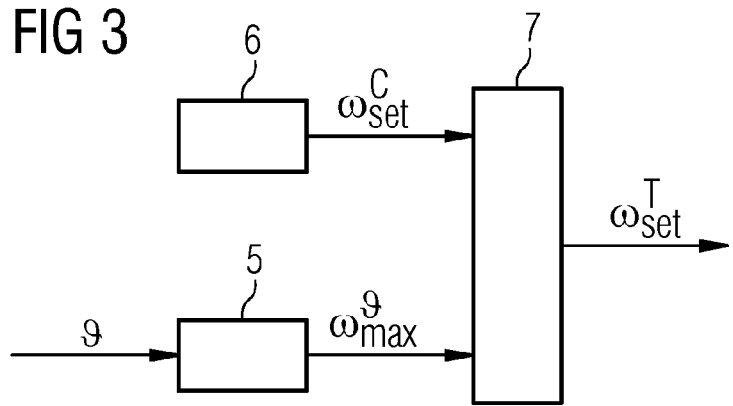
FIG 4
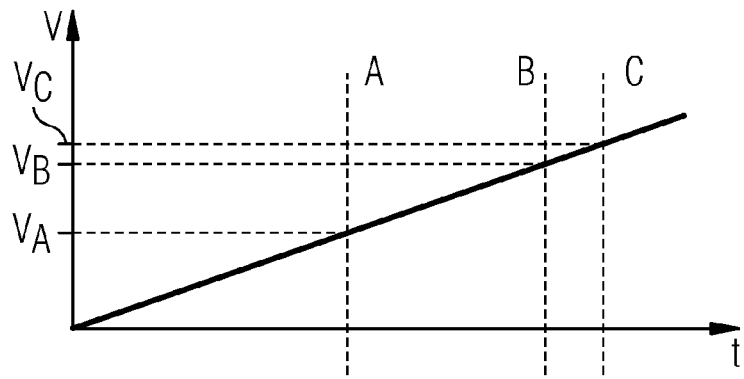
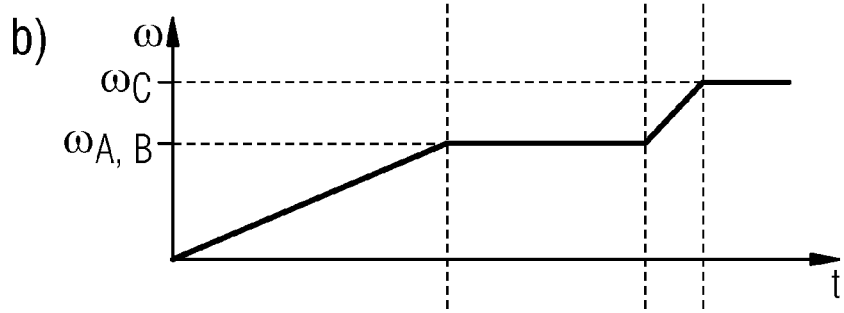
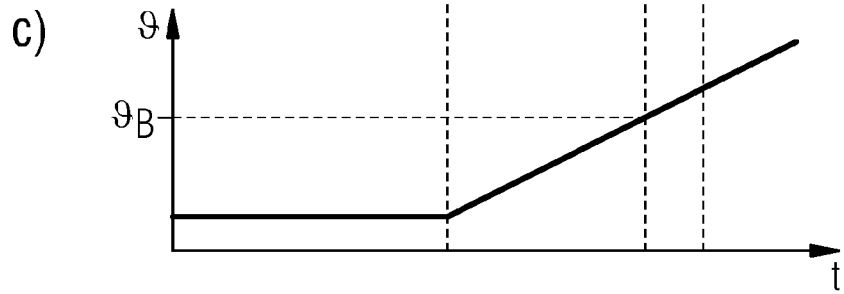

METHOD FOR CONTROLLING A WIND TURBINE

CROSS REFERENCE TO RELATED APPLICATIONS

This application claims priority of European Patent Application No. 11195341.0 EP filed Dec. 22, 2011. All of the applications are incorporated by reference herein in their entirety.

FIELD OF INVENTION

A method for controlling a wind turbine, a control unit for controlling a wind turbine and a wind turbine are provided.

BACKGROUND OF INVENTION

The extreme load is in several cases the design driving factor in tower design. To improve the turbine power output it is necessary to increase the rotational speed of the turbine, both to reduce gear loads and improve aerodynamic efficiency. However, an increased rotational speed may result in higher extreme load.

Turbines today have a fixed maximum speed. At this speed the extreme loads are known and used to design the turbine. The turbine controller will constantly aim to hold this speed, especially at high wind speeds.

It turns out that the turbine controller has the biggest problem with extreme loads when the pitch angle is at optimum, which is the angle that optimizes the power extraction. This is due to the fact that the thrust force on the rotor is largest around this operation point.

SUMMARY OF INVENTION

It is an object to provide a method for controlling a wind turbine. Further objects are to provide a control unit for controlling a wind turbine and a wind turbine.

The objects are solved by a method for controlling a wind turbine, by a control unit for controlling a wind turbine and by a wind turbine as claimed in the independent claims. The depending claims define further developments.

The method for controlling a wind turbine is related to a wind turbine comprising at least one rotor blade and a generator. The method for controlling a wind turbine is characterised in adjusting a pitch angle $\theta$ of the rotor blade and determining the limit of an input value based on the adjusted pitch angle $\theta$, wherein the input value comprises information about the turbine rotational speed.

The input value may be the wind turbine rotational speed or a value or quantity correlating with the wind turbine rotational speed. For example the input value may be the power, for instance the nominal power.

When the turbine has a pitch angle different from the optimum it is possible to increase the rotational speed without exceeding the design given extreme loads. The present method is based on the realization that a pitch position different from the optimum reduces extreme loads if an event that causes an emergency stop occurs.

This concept allows increasing the turbine rotational speed that results in higher extreme load in case of emergency stop. By only allowing a rotational speed increase compared to the fixed speed, while the pitch angle is away from optimum, the increase in extreme loads during emergency stop can be minimized or may be entirely removed.

Advantageously, the optimum pitch angle $\theta_{opt}$ of the rotor blade can be determined and the pitch angle $\theta$ ($\theta > \theta_{opt}$) can be adjusted higher than the optimum pitch angle $\theta_{opt}$, when the input value, for example the wind turbine rotational speed, reaches a predetermined value, for example a predetermined rotational speed. Preferably, the pitch angle $\theta$ can be adjusted such that a further increase $\Delta\theta$ of the adjusted pitch angle $\theta + \Delta\theta$ causes a smaller change in a quantity correlating with thrust force $\Delta C_t$, for example in thrust force $\Delta C_t$, than the same increase $\Delta\theta$ of the optimum pitch angle $\theta_{opt} + \Delta\Delta\theta$. This reduces the thrust force change during further control operations and reduces extreme loads.

Furthermore, the turbine rotational speed limit can be determined as the minimum value of the rotational speed limit based on the adjusted pitch angle $\theta$ and a rotational speed setpoint obtained by a controller. For example, the rotational speed limit based on the adjusted pitch angle $\theta$ can be obtained or calculated or determined based on the adjusted pitch angle $\theta$. The rotational speed setpoint can be calculated or determined by the controller.

Moreover, the rotational speed can be altered, advantageously increased. For example, the rotational speed can be altered as a function of the adjusted pitch angle $\theta$ and/or as a function of the ambient wind speed v. Preferably, the rotational speed can be altered, for instance increased, stepwise. The rotational speed of the generator can be altered stepwise as a function of the pitch angle $\theta$ and/or as a function of the ambient wind speed v. For example, the rotational speed can be increased as a function of the adjusted pitch angle $\theta$ and/or as a function of the ambient wind speed v.

Furthermore, the pitch angle $\theta$ can be increased, preferably continuously increased, when the rotational speed reaches a predetermined value.

A maximum wind speed value can be defined where the wind turbine can operate with the adjusted pitch angle $\theta$ of the rotor blade. A first wind speed value $v_A$ which is smaller than the maximum wind speed value can be set, and then the pitch angle $\theta$ of the rotor blade can be increased when the ambient wind speed v reaches the first wind speed value $v_A$. Moreover, a second wind speed value $v_C$ can be set which is smaller than the maximum wind speed value. The rotational speed $\omega$ of the generator can then be set to a particular value $\omega_C$ when the ambient wind speed reaches the second wind speed value $v_C$. Additionally, a third wind speed value $v_B$ can be set which is smaller than the second wind speed value $v_C$ and larger than the first wind speed value $v_A$. Then the rotational speed $\omega$ of the generator can be altered, preferably increased, as a function of the pitch angle $\theta$ when the ambient wind speed reaches the third wind speed value $v_B$.

Furthermore, the rotational speed $\omega$ of the generator can be increased as a function of the pitch angle $\theta$ when the pitch angle reaches a predefined value $\theta_B$.

Moreover, the optimal pitch angle of the rotor blade can be adjusted, wherein the optimal pitch angle is the pitch angle for obtaining the maximum power efficiency of the wind turbine. This means, the optimal pitch angle is defined as the pitch angle for obtaining the maximum power efficiency of the wind turbine. This optimal pitch angle can be adjusted as initial or current pitch angle of the rotor blade.

The pitch angle can be continuously altered, for example increased. In the context, increasing the pitch angle means feathering the pitch angle or changing the pitch angle such that the rotor blade is feathered.

By use of the method it is possible to increase the turbine rotational speed that results in higher extreme load, for example in case of an emergency stop. By only allowing a rotational speed increase compared to the fixed speed, while the pitch angle is away from optimum, the increase in extreme loads during emergency stop can be minimized or may be entirely removed.

The control unit for controlling a wind turbine comprises a rotor and at least one rotor blade. The control unit comprises a device for adjusting a pitch angle θ of the rotor blade and means for determining the limit of an input value according to the method as previously described. The means for determining the limit of the input value can be a device determining the limit of the input value or a computer program.

The wind turbine comprises a control unit as previously described. Generally, the control unit and the wind turbine have the same advantages as the previously described method.

A method and a control unit for performing the method are provided which reduce extreme loads in an event that causes an emergency stop. This at the same time improves a save performance of the wind turbine.

Further features, properties and advantages will become clear from the following description of an embodiment in conjunction with the accompanying drawings. The embodiment does not limit the scope which is determined by the appended claims. All described features are advantageous as separate features or in any combination with each other.

BRIEF DESCRIPTION OF THE DRAWINGS

FIG. 1 schematically shows the turbine power efficiency as function of pitch angle for a fixed wind speed and a fixed rotational speed.

FIG. 2 schematically shows the aerodynamic thrust force from the turbine as a function of the pitch angle for a fixed wind speed and a fixed rotational speed.

FIG. 3 schematically shows part of a control procedure for obtaining a turbine speed set point.

FIG. 4 schematically shows the operation curves of a wind turbine.

DETAILED DESCRIPTION OF INVENTION

An embodiment will now be described with reference to FIGS. 1 to 4.

FIG. 1 schematically shows the turbine power efficiency $C_p$ as a function of the pitch angle θ for a fixed wind speed and for a fixed rotational speed of the rotor or generator.

A wind turbine rotor blade comprises a span direction and a longitudinal axis parallel to the span. The pitch angle describes a rotation of the wind turbine rotor blade about its longitudinal axis or about its span.

In FIG. 1 the power efficiency was normalised and is plotted in arbitrary units. The curve 1, which represents the dependence of the power efficiency on the pitch angle, shows maximum power efficiency for a pitch angle of 3°. For pitch angles between 3° and about 5° the curve 1 shows a negative slope with a smaller absolute value than the slope of the curve 1 at a pitch angle between 5° and 12°.

The arrow 2 indicates the maximum power efficiency, which corresponds to an optimal pitch angle $θ_{opt}$, in the present example 3°. When in optimum, a change in the pitch angle Δθ will yield a given reduction in $C_p$. This is indicated in FIG. 1 by the thick black lines close to the arrow 2. The same change Δθ in pitch at a position, where the turbine is at a position different from optimum $C_p$ or maximum power efficiency or optimal pitch angle $θ_{opt}$, will yield a larger reduction in the power efficiency $C_p$. This is in FIG. 1 indicated by an arrow 3. In this example the pitch angle θ was increased from 7.5° to 9°. This increase of 1.5° pitch angle results in a larger reduction of power efficiency at position 3 (vertical black line 13) compared with the obtained reduction in power efficiency at position 2 (vertical black line 12). This is indicated by the vertical black lines 12 and 13 in FIG. 1. The controller can therefore in a very short time reduce the energy capture of the wind and thereby be able to faster stop the turbine.

FIG. 2 schematically shows the normalised thrust force $C_t$ curve 4 for a fixed wind speed and for a fixed rotational speed of the rotor or generator. The x-axis shows the pitch angle θ in degrees. The y-axis shows the normalised $C_t$ in arbitrary units. For pitch angles θ between 3° and about 8° the curve 4 shows a negative slope with a higher absolute value than the slope of the curve 4 at a pitch angle between 8° and 12°.

$C_t$ is proportional to the aerodynamic thrust force on the turbine. The maximum thrust on the rotor is at the energy-wise optimal pitch angle. However this also means that the absolute change in thrust when pitch from the energy-wise optimal pitch angle to the stop pitch angle is very large. This large change in thrust force causes extreme loading of the turbine. However, if the pitch angle θ is already pitched away from the energy-wise optimal pitch angle, for example to a pitch angle θ as indicated by the arrow 3 in FIG. 1 and FIG. 2, then the absolute thrust change (see the vertical black line 23 in FIG. 4) is significantly smaller, especially when pitching to stop, compared with the absolute thrust change in case that the pitch angle θ is the energy-wise optimal pitch angle (see the vertical black line 22 in FIG. 4).

If the pitch angle is already away from optimum, the turbine controller will be able to stop the turbine faster because of the large reduction in $C_p$ without a huge change in thrust force $C_t$. Together this yield lowered extreme load of the turbine in emergency events.

In practice the turbine will be controlled by selecting a maximum rotational speed as a function of the current adjusted pitch angle θ. This is for example illustrated in FIG. 3. For the adjusted pitch angle θ a maximum rotational speed $ω_{max}^θ$ or speed limit is selected by means of a look up table 5. A controller 6 provides a rotational speed set point $ω_{set}^C$. The minimum value or the smaller rotational speed value between $ω_{max}^θ$ and $ω_{set}^C$ is chosen by means of a selecting means 7 to obtain the speed set point for the turbine $ω_{set}^T$. Thereby the active speed limit $ω_{set}^T$ for the turbine will always be chosen according the current operational conditions, namely the pitch angle θ.

The operation curves of the turbine are illustrated in FIG. 4. FIG. 4a) schematically shows the ambient wind speed v in m/s as a function of the time t. In the present fictitious setup the wind speed is ramped. FIG. 4b) schematically shows the rotational speed θ of the generator as a function of the time t. FIG. 4c) schematically shows the pitch angle θ as a function of the time t.

Once the turbine reaches a fixed rotational speed ω, which is indicated by A in all three Figures and corresponds to the first wind speed value $v_A$, the pitch angle θ is altered, for example increased. This is shown by the increasing curve in FIG. 4c) for a time value larger than the time at A. In this case the turbine pitches to feather, which means that the power efficiency $C_p$ declines.

Once the pitch angle θ reaches a significant value, which corresponds to the value indicated by B in all Figures corresponding to the third wind speed value $v_B$ and which is designated as $θ_B$, the generator speed ω is altered, in the present example increased, as a function of the pitch angle θ. This is shown in FIG. 4b) between time value corresponding to B (third wind speed value $v_B$) and C (second wind speed value $v_C$). In this case the generator rotational speed ω is increased.

While the wind speed v continues to ramp up into region C (second wind speed value $v_C$), the turbine speed $\omega$ is again fixed to a new value $\omega_C$. In the local region between B (third wind speed value $v_B$) and C (second wind speed value $v_C$) in the present example, the turbine undergoes dynamic speed adjustment.

In the method for controlling a wind turbine, the pitch angle of one or more blades of the wind turbine is set different from the optimum pitch angle. The pitch angle can be increased away from the optimum pitch angle when the turbine or generator reaches a fixed or predefined rotational speed $\omega_A$, for example corresponding to the first wind speed value $v_A$. The turbine or generator rotational speed $\omega$ can be stepwise increased in relation to the pitch angle value $\theta$ and/or the wind speed v. Generally, the pitch angle can continuously be increased.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method of controlling a wind turbine with a rotor and a rotor blade, comprising:
   adjusting a pitch angle of a rotor blade of the wind turbine, determining a limit of an input value based on an adjusted pitch angle, wherein the input value comprises information about a rotational speed of the wind turbine; and
   adjusting the pitch angle such that a further increase of the adjusted pitch angle causes a smaller change in a quantity correlating with thrust force than a same increase of the optimum pitch angle.

2. The method as claimed in claim 1, further comprising:
   determining an optimum pitch angle of the rotor blade, and
   adjusting the pitch angle higher than the optimum pitch angle when the input value reaches a predetermined value.

3. The method as claimed in claim 1, further comprising:
   determining a turbine rotational speed limit as a minimum value of the rotational speed limit based upon the adjusted pitch angle and a rotational speed setpoint obtained by a controller.

4. The method as claimed in claim 1, further comprising:
   altering the rotational speed.

5. The method as claimed in claim 4, further comprising:
   altering the rotational speed as a function of the adjusted pitch angle and/or an ambient wind speed.

6. The method as claimed in claim 4, wherein the rotational speed is altered stepwise.

7. The method as claimed in claim 1, further comprising:
   increasing the pitch angle when the rotational speed reaches a predetermined value.

8. The method as claimed in claim 1, further comprising:
   defining a maximum wind speed value where the wind turbine operates with the adjusted pitch angle of the rotor blade,
   setting a first wind speed value which is smaller than a maximum wind speed value, and
   increasing the pitch angle of the rotor blade when an ambient wind speed reaches the first wind speed value.

9. The method as claimed in claim 8, further comprising:
   setting a second wind speed value which is smaller than the maximum wind speed value, and
   adjusting the rotational speed of the wind turbine when the ambient wind speed reaches the second wind speed value.

10. The method as claimed in claim 9, further comprising:
    setting a third wind speed value which is smaller than the second wind speed value and larger than the first wind speed value, and
    altering the rotational speed of the wind turbine as a function of the pitch angle when the ambient wind speed reaches the third wind speed value.

11. The method as claimed in claim 1, further comprising:
    increasing the rotational speed of the wind turbine as a function of the pitch angle when the pitch angle reaches a predefined value.

12. A control unit for controlling a wind turbine with a rotor and a rotor blade, wherein the control unit comprises a device for adjusting a pitch angle of the rotor blade and means for determining a limit of an input value according to the method as claimed in claim 1.

13. A wind turbine, comprising:
    a control unit as claimed in claim 12.

* * * * *